US005594934A

United States Patent [19]

Lu et al.

[11] Patent Number: 5,594,934

[45] Date of Patent: Jan. 14, 1997

[54] REAL TIME CORRELATION METER

[75] Inventors: Daozheng Lu, Dunedin, Fla.; Barry P. Cook, New Canaan, Conn.

[73] Assignee: A.C. Nielsen Company, Northbrook, Ill.

[21] Appl. No.: 309,804

[22] Filed: Sep. 21, 1994

[51] Int. Cl.[6] .......... H04N 7/00

[52] U.S. Cl. .......... 455/2; 348/1

[58] Field of Search .......... 348/1–5; 455/2; 358/84; 381/58; H04N 7/00, 5/44

[56] References Cited

U.S. PATENT DOCUMENTS

| | | | |
|---|---|---|---|
| 4,025,851 | 5/1977 | Haselwood et al. . | |
| 4,230,990 | 10/1980 | Lert, Jr. et al. . | |
| 4,425,578 | 1/1984 | Haselwood et al. . | |
| 4,511,917 | 4/1985 | Kohler | 455/2 |
| 4,697,209 | 9/1987 | Kiewit et al. . | |
| 4,858,000 | 8/1989 | Lu . | |
| 4,930,011 | 5/1990 | Kiewit . | |
| 4,943,963 | 7/1990 | Waechter et al. . | |
| 4,955,070 | 9/1990 | Welsh et al. | 455/2 |

FOREIGN PATENT DOCUMENTS

| | | | |
|---|---|---|---|
| 0011062 | 7/1991 | WIPO | 455/2 |

*Primary Examiner*—David E. Harvey
*Attorney, Agent, or Firm*—Marshall, O'Toole, Gerstein, Murray & Borun

[57] ABSTRACT

A correlation meter is disclosed for determining tuning status of a tunable receiver. The correlation meter receives an output of the tunable receiver, such as an acoustic audio output of the tunable receiver. An analog to digital converter converts the output of the tunable receiver to a digital sample side representation. An antenna or other signal collector receives reference side representations corresponding to channels to which the tunable receiver may be tuned. The correlation meter correlates the digital sample side representation and the reference side representations as the reference side representations are received by the correlation meter in order to determine the tuning status of the tunable receiver.

55 Claims, 8 Drawing Sheets

REAL TIME CORRELATION METER

TECHNICAL FIELD OF THE INVENTION

The present invention relates generally to a meter for monitoring a tunable receiver, and more particularly to a real time correlation meter which determines the tuning status of a tunable receiver by correlating, substantially in real time, a sample side representation of an output of the tunable receiver and reference side representations supplied by a remote source of reference side representations.

BACKGROUND OF THE INVENTION

Television and/or radio programs are currently transmitted over the air, over cables, by way of satellites, and/or the like. Regardless of how television and/or radio programs are transmitted to customers, there is a desire to determine the audience of such programs. Thus, television and/or radio receivers are currently metered by existing channel meters in order to determine the channels to which such receivers are tuned by statistically selected panelists. This channel information is used, at least in part, to assemble television and/or radio rating reports. Such rating reports typically provide information such as each program's share, or percentage, of the television and/or radio audience during the time that the corresponding program was transmitted.

Audience rating information is potentially useful in a wide variety of areas. Advertisers may wish to use audience rating information in order to determine an appropriate cost for the channel time which they purchase for advertising their products. Broadcasters, such as network broadcasters, independent broadcasters, cable operators, and the like, may wish to use audience rating information as a factor in determining the amount which they should charge for the channel time which is to be purchased by advertisers or as a factor in making program selection and scheduling decisions. Performers may wish to use audience rating information in helping them to determine reasonable compensation for their performances or to determine residuals which they may be owed for past performances.

Several different methodologies are employed in order to acquire audience rating information. In one such methodology, diaries are manually maintained by panelists. Thus, the panelists are required to enter into the diaries the programs to which they tune their receivers. Diaries, however, present a number of problems. For example, panelists may forget on occasion to enter their program selections into their diaries. Also, diaries are manually distributed by the ratings company, manually maintained by the panelists to which they are distributed, and manually retrieved by the ratings company so that the data contained therein may be analyzed in order to derive audience rating information therefrom. This manual process is time consuming and labor intensive. Moreover, it is often necessary to provide audience rating information on the day of, or the day following, the transmission of a program to end users. The diary methodology is an impediment to such a rapid turnaround time.

In another methodology, an audience meter is physically connected to a receiver to be metered. The audience meter automatically determines the channel to which the metered receiver is tuned. The audience meter also typically includes a set of switches each of which is assigned to an individual panelist of a selected household. The switches are operated by the panelists of the selected household in order to signal the audience meter that the panelists of the selected household have become active members of the audience. Accordingly, the audience meter not only provides information identifying the channels to which the metered receiver is tuned, but also provides information relating to the demographics of the audience.

This audience meter works reasonably well since it reduces the active participation of the panelists in the metering process. This audience meter also works reasonably well since the data stored by the audience meter may be electronically retrieved. Because the data is electronically retrieved, the data may be retrieved more frequently and easily than in the case of diaries. That is, the audience meter includes a modem connected to a transmission system, such as the public telephone system. Periodically, a ratings company instructs the audience meter to transmit its stored data to the ratings company. This transmission can be prompted as often as the ratings company desires. Thus, diaries need not be manually distributed and retrieved, the panelists of the selected households are not required to manually enter program information into the diaries, and tuning and demographic data may be retrieved as frequently as is desired.

However, such audience meters also have some problems associated with them. For example, the sophisticated receiver equipment in use today makes the determination of actual channel numbers very difficult. This sophisticated receiver equipment may include a television which is arranged to receive programs distributed by satellites, cables, VCRs, and over-the-air antennae. Since at least some of these programs are passed to the television over a predetermined channel, such as channel 3, the determination of the actual number of the channel carrying the program being viewed is indeed very difficult.

Furthermore, even when audience meters are able to accurately determine the actual channel numbers of the channels carrying the programs chosen by the selected panelists for reception, such audience meters determine only these channel numbers. These audience meters do not identify the programs chosen by the selected panelists for reception. In order to identify chosen programs based upon the channel information retrieved from the audience meters, a ratings company often stores program tables. These program tables identify, by channel, date, and time, those programs which networks, cable operators, and the like, are expected to distribute to their customers. Thus, by use of these program tables, programs may be determined based upon the channels to which the metered receivers are tuned.

Because program tables have been typically assembled manually, and because program tables are assembled from program schedule information usually acquired before the programs are actually transmitted, errors may arise if the program schedule is incorrectly entered and/or if the program schedule changes between the time that the program tables as entered and the time that the receivers are metered. Furthermore, there is considerable labor involved in acquiring program schedule information and in assembling program tables from this information.

Accordingly, program verification systems have been devised in order to automatically determine the programs which are actually transmitted to end users. Program verification systems typically involve either the detection of embedded program codes or the use of pattern matching. Embedded program codes uniquely identify the programs into which the program codes are embedded so that their detection in a transmitted program may be used the verify which programs were transmitted, over which channels the programs were transmitted, and during which time slots the programs were transmitted. In pattern matching, sample patterns (which may alternatively be referred to as signatures) are extracted from each of the programs as they are transmitted during each time slot and over each channel. These sample patterns are correlated with reference patterns which were previously extracted from those programs. Matches then indicate which programs were transmitted during which time slots and over which channels. This information may be used to electronically generate a program table or may be used to simply verify that programs were transmitted. However, program verification systems using embedded program codes have the problem that not all programs contain embedded program codes, and program verification systems using pattern matching have the problem that they are expensive to support.

Moreover, current audience meters are physically connected to the tunable receivers that they meter. Therefore, such audience meters are incapable of metering receivers which are remote from fixed locations of the selected panelists' tunable receivers. These locations are typically the homes of the selected panelists. Thus, if a selected panelist may be viewing, or listening to, a program being received by receiver which is located outside of the selected panelist's home, such as at a sports bar, at the home of a friend, or in an automobile, the fact that the panelist is in the audience of a program to which a non-metered tunable receiver is tuned will go unrecorded. The failure to record this event distorts the audience rating information ultimately generated relative to that program and the programs with which it competed.

The present invention solves one or more of the above described problems.

SUMMARY OF THE INVENTION

In a first aspect of the present invention, a correlation meter comprises first and second receivers and a correlator. The first receiver receives an output of a tunable receiver and provides a sample side representation. The sample side representation represents a pattern of the output of the tunable receiver. The second receiver receives a plurality of reference side representations from a remote source of reference side representations. The reference side representations represent a plurality of patterns corresponding to signals carried by a plurality of channels to which the tunable receiver may be tuned. The correlator correlates the sample side representation and the reference side representations substantially as the reference side representations are received by the second receiver in order to determine a tuning status of the tunable receiver.

In another aspect of the present invention, a real time tunable receiver monitoring system comprises a first receiver for receiving a plurality of transmission signals carried by a plurality of corresponding channels. The channels correspond to channels to which a tunable receiver may be tuned. An apparatus is coupled to the first receiver and generates a plurality of reference side representations based upon the transmission signals received by the first receiver. Each reference side representation represents a pattern of a corresponding transmission signal. A transmitter is coupled to the apparatus and transmits the reference side representations. A second receiver receives the reference side representations. A third receiver receives an output of a tunable receiver and provides a sample side representation of the output. The sample side representation represents a pattern of the output. A correlator is coupled to the second and third receivers and correlates the sample side representation and the reference side representations in order to thereby determine a tuning status of the tunable receiver. The reference side representations are correlated by the correlator to the sample side representation substantially in real time.

In yet another aspect of the present invention, a portable correlation meter comprises a microphone, an antenna, a receiver, and a processor. The microphone is arranged to receive an acoustic audio output of a tunable receiver, to transduce the acoustic audio output into an electrical signal, and to provide the electrical signal as a sample side representation. The antenna is arranged to receive a carrier which is modulated with reference side representations of transmission signals to which the tunable receiver may be tuned. The receiver is coupled to the antenna and is arranged to demodulate the modulated carrier in order to extract the reference side representations therefrom. The processor is coupled to the microphone and to the receiver, and is arranged to correlate the sample side representation and the reference side representations substantially as the reference side representations are received by the antenna in order to determine a tuning status of the tunable receiver.

In still another aspect of the present invention, a tunable receiver monitoring system comprises a reference signature generator and a receiver monitor located remotely from one another. The reference signature generator includes a reference signature extractor for extracting reference signatures from a plurality of corresponding channels. These channels correspond to channels to which a tunable receiver may be tuned. The reference signature generator also includes a reference signature transmitter for transmitting the reference signatures. The receiver monitor includes a reference signature receiver for receiving the transmitted reference signatures from the reference signature transmitter. The receiver monitor also includes a sample signature extractor for extracting a sample signature from an output of a tunable receiver to be monitored. This output corresponds to a channel to which the tunable receiver is tuned. The receiver monitor further includes a correlator coupled to the reference signature receiver and to the sample signature extractor. The correlator correlates the sample signature and the reference signatures substantially in real time in order to determine a tuning status of the tunable receiver.

BRIEF DESCRIPTION OF THE DRAWING

These and other features and advantages will become more apparent from a detailed consideration of the invention when taken in conjunction with the drawing in which.

DETAILED DESCRIPTION

The real time correlation meter of the present invention may be embodied as a portable real time correlation meter, as a fixed location real time correlation meter, or the like. The real time correlation meter of the present invention embodied as a portable real time correlation meter is illustrated in FIGS. 1–5.

Figure 1:
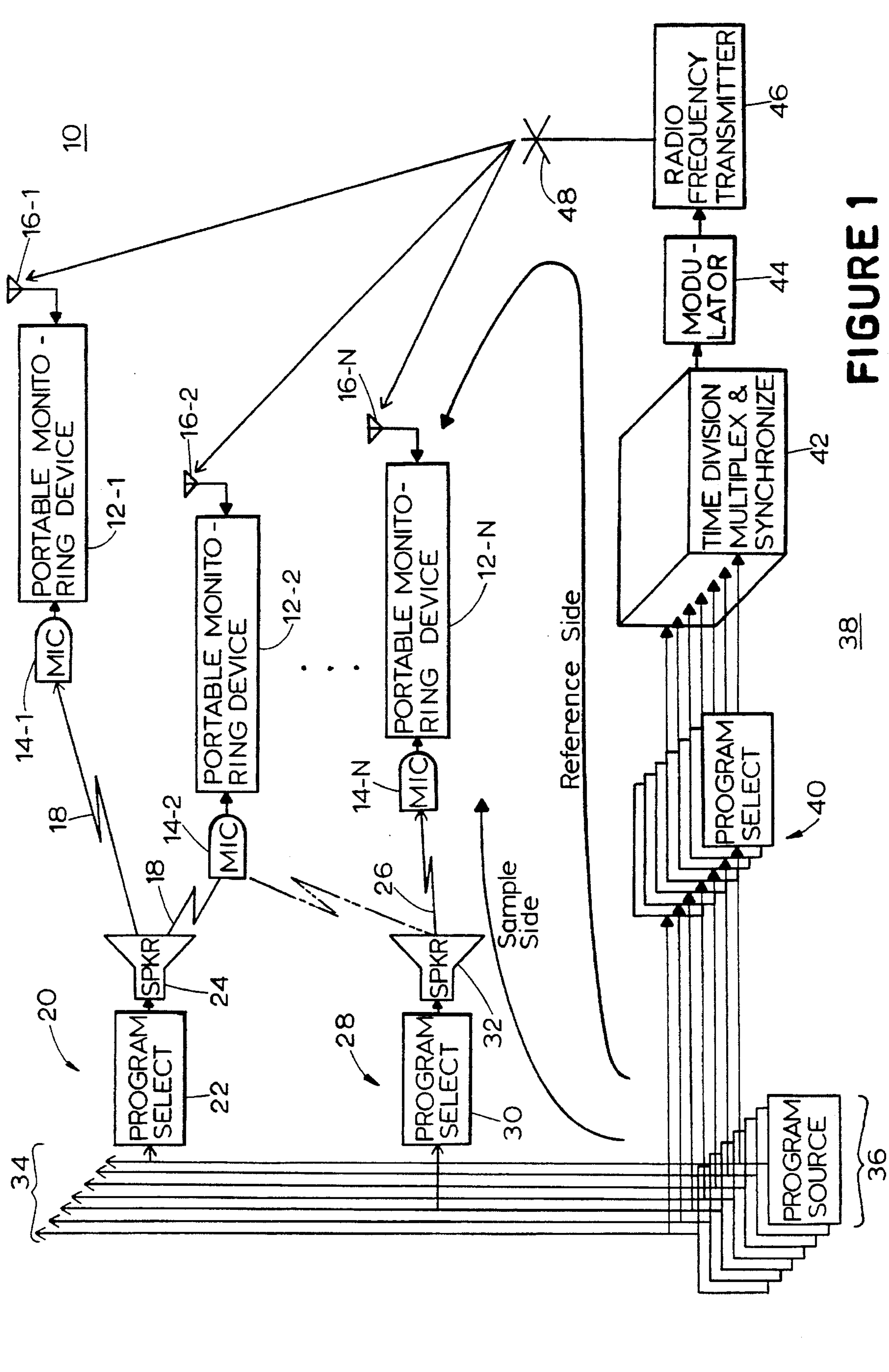
FIG. 1 illustrates a tunable receiver monitoring system which includes a plurality of portable real time correlation meters for determining the channels to which a plurality of tunable receivers are tuned.

As shown in FIG. 1, a tunable receiver monitoring system 10 includes a plurality of portable real time correlation meters in the form of a plurality of portable real time correlation monitoring devices 12-1 through 12-N. Each of the real time correlation monitoring devices 12-1 through 12-N may be carried by a corresponding panelist of the audience to be measured. Each of the portable real time correlation monitoring devices 12-1 through 12-N may each include a battery, such as a rechargeable battery, for supplying power to the electronic circuitry thereof.

The portable real time correlation monitoring device 12-1 has a microphone 14-1 and a receiving antenna 16-1. Similarly, the portable real time correlation monitoring device 12-2 has a microphone 14-2 and a receiving antenna 16-2, and the portable real time correlation monitoring device 12-N has a microphone 14-N and a receiving antenna 16-N. The microphones 14-1 through 14-N of the corresponding portable real time correlation monitoring devices 12-1 through 12-N are arranged to acoustically detect the audio outputs of receivers and to transduce the audio outputs into corresponding electrical signals for processing by the electronic circuitry of the corresponding portable real time correlation monitoring devices 12-1 through 12-N.

The portable real time correlation monitoring devices 12-1 through 12-N are carried on the persons of their corresponding panelists so that the portable real time correlation monitoring devices 12-1 through 12-N meter tunable receivers which are both within, and outside of, the homes of the panelists. Thus, the portable real time correlation monitoring devices 12-1 through 12-N meter tunable receivers when the panelists carrying the portable real time correlation monitoring devices 12-1 through 12-N are close enough to be in the audience of the metered tunable receivers. That is, the metered tunable receivers may be inside or outside the panelists' homes.

As an example, the portable real time correlation monitoring device 12-1 is shown in FIG. 1 as being presently in a location where its corresponding microphone 14-1 detects an acoustic audio output 18 from a tunable receiver 20 which can be metered by the portable real time correlation monitoring device 12-1. The tunable receiver 20 may be a television receiver, a radio receiver, and/or the like. The tunable receiver 20 includes a program selector 22 (i.e., tuner) for selecting programs, and a speaker 24 for acoustically projecting the audio output of the selected program to an audience. In addition to the portable real time correlation monitoring device 12-1, the portable real time correlation monitoring device 12-2 may have been carried by its corresponding panelist into a location where its microphone 14-2 can pick up the acoustic audio output 18 from the speaker 24. The portable real time correlation monitoring device 12-N is in a location where its corresponding microphone 14-N can receive an acoustic audio output 26 from a tunable receiver 28 to be metered. As in the case of the tunable receiver 20, the tunable receiver 28 has a program selector 30 (i.e., tuner) and a speaker 32. The program selector 30 selects a channel, and the speaker 32 transduces an electrical signal representing a program carried on the selected channel into the acoustic audio output 26 so that the acoustic audio output 26 may be perceived by an audience.

The program selectors 22 and 30 of the tunable receivers 20 and 28 may select from a plurality of transmission signals 34 which are transmitted by a plurality of program sources 36 over a corresponding plurality of channels. The plurality of program sources 36 may be, for example, AM radio stations for transmitting AM channels, FM radio stations for transmitting FM channels, television stations for transmitting both VHF and UHF television channels, cable headends for transmitting cable channels, and/or the like.

The plurality of transmission signals 34 transmitted by the plurality of program sources 36 are also received by a reference side processing system 38 which may comprise either a separate tuner for each of the channels over which the transmission signals 34 to be monitored are transmitted or a scanning tuner which can be controlled so that it tunes, in turn, to each of the plurality of channels over which the transmission signals 34 are transmitted by the plurality of program sources 36.

Electrical signals representing the programs carried by the channels selected by the program selector 40 (i.e., tuner) are supplied to a processing section 42 of the reference side processing system 38. The processing section 42 samples each of the electrical signals representing the programs carried by the channels selected by the program selector 40, filters the sampled electrical signals to produce reference side representations of the electrical signals corresponding to the programs carried by the channels selected by the program selector 40, adds channel information to the reference side representations, and supplies the reference side representations in a time division multiplex format as a modulation signal to a modulator 44. If desired, program identification information may also be added to the reference side representations. These reference side representations represent the patterns of the electrical signals corresponding to the channels transmitted by program sources, and may be referred to as reference signatures.

The modulator 44, for example, modulates an FM radio frequency sub-carrier signal with the modulation waveforms received from the processing section 42, and supplies the modulated FM sub-carrier to a radio frequency transmitter 46. The radio frequency transmitter 46 transmits the modulated radio frequency signal over the air by the use of a transmitting antenna 48. The transmitted modulated radio frequency signal may be detected by the receiving antennae 16-1 through 16-N of the corresponding portable real time correlation monitoring devices 12-1 through 12-N. Transmission media, other than an FM radio frequency subcarrier, may be used to transmit the reference side representations to the portable real time correlation monitoring devices 12-1 through 12-N. For example, television sidebands, cellular telephones, AM transmitters, microwave transmitters, satellites, prior or existing versions of the public telephone system, and/or the like may be used to transmit the reference side representations to the portable real time correlation monitoring devices 12-1 through 12-N.

The portable real time correlation monitoring devices 12-1 through 12-N compare the reference side representations transmitted by the transmitting antenna 48 to the sample side representations derived from the audio outputs of the tunable receivers 20 and 28, provided that the portable real time correlation monitoring devices 12-1 through 12-N are close enough to the tunable receivers 20 and 28 to detect their corresponding audio outputs.

Figure 2:
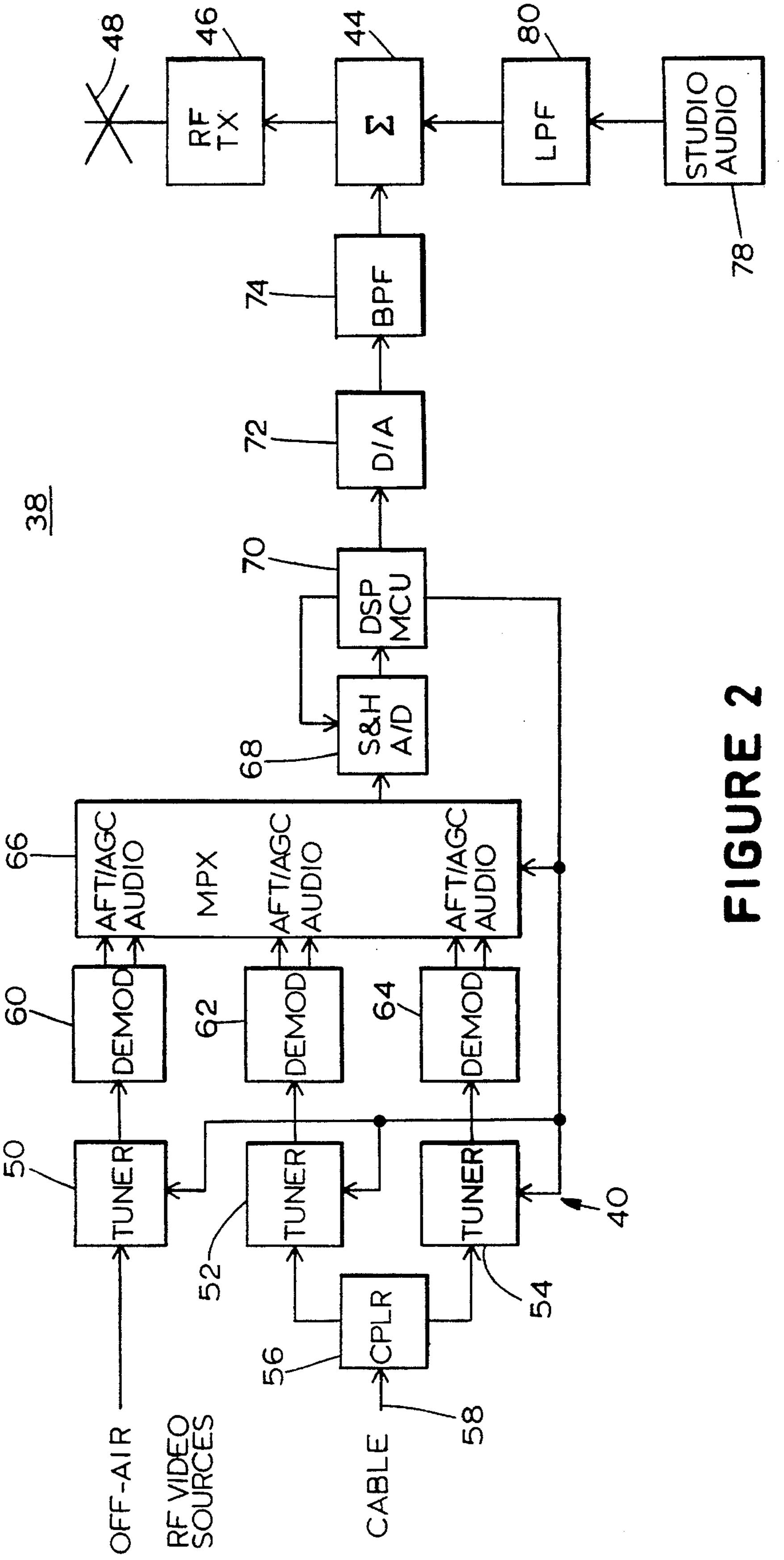
FIG. 2 illustrates the reference side of the tunable receiver monitoring system shown in FIG. 1 in additional detail.

The reference side processing system 38 is shown in more detail in FIG. 2. The program selector 40 includes a tuner 50, which may be a scanning tuner and which may be arranged to detect those of the plurality of transmission signals 34 which are transmitted over the air to end users. The program selector 40 also includes a pair of tuners 52 and 54 each of which may be a scanning tuner and each of which receives an output from a coupler 56 which receives cable channels. The coupler 56 couples all of the cable channels received over a cable 58 to both of the tuners 52 and 54. The tuner 52 is arranged to select a first portion of the cable channels, and the tuner 54 is arranged to select a second portion of the cable channels. The number of tuners in the program selector 40 depends on the number of selectable channels and the capacity of each tuner. Thus, more than one tuner may be necessary if the number of cable channels and if the number of over-the-air channels to be monitored are beyond the capacity of a single scanning tuner. Also, tuners may be arranged to tune to channels which are transmitted by way of other facilities such as satellites, microwave transmitters, and the like.

Furthermore, it is desirable to provide a reference side representation of each channel as often as possible in order to increase the resolution of the tunable receiver monitoring system 10. Thus, if a reference side representation is produced for each channel every second, for example, the tunable receiver monitoring system 10 can determine within one second when a panelist is receiving a program. Therefore, since each tuner may require settling time (i.e., time for the tuned signal to stabilize following tuning), it may be necessary to increase the number of tuners in order to cycle through all of the possible channels within a predetermined amount of time. Accordingly, the output of one tuner may be processed while the output of another tuner is settling.

The tuner 50 supplies its output to a corresponding demodulator 60, the tuner 52 supplies its output to a corresponding demodulator 62, and the tuner 54 supplies its output to a corresponding demodulator 64. The demodulators 60, 62, and 64 extract the audio signals, as well as the automatic fine tuning (AFT) and/or automatic gain control (AGC) signals, from the outputs of their corresponding tuners 50, 52, and 54. The demodulators 60, 62, and 64 supply their corresponding audio, AFT, and AGC outputs to a multiplexer 66 which connects the outputs from the demodulators 60, 62, and 64, one at a time, to an analog to digital converter 68. The analog to digital converter 68 performs a sample and hold function, and converts the analog quantity received from the multiplexer 66 to a corresponding digital quantity.

The analog to digital converter 68 is connected to a digital signal processor (DSP) 70. The digital signal processor 70 synchronizes the operation of the tuners 50, 52, and 54, as well as the multiplexer 66 and the analog to digital converter 68. Accordingly, the digital signal processor 70 causes the tuners 50, 52, and 54 to select respective channels, and controls the multiplexer 66 to supply the demodulated outputs of the tuners 50, 52, and 54, in turn, to the analog to digital converter 68. The sample and hold portion of the analog to digital converter 68 samples and holds a current value of the channel signals supplied to it by the multiplexer 66. The sampling rate used by the analog to digital converter 68 is determined by system requirements, which may be based primarily on Nyquist criteria, Fourier transform algorithms, digital filter requirements, and/or the like. The analog to digital converter 68 may use, for example, a 8 KHz sample rate which produces a 4 KHz bandwidth.

If desired, the multiplexer 66, under control of the digital signal processor 70, may read the AFT and AGC voltage levels from the demodulators 60, 62, and 64. Also, if the tuners 50, 52, and 54 are television tuners, the video signal supplied by the tuners 50, 52, and 54 may be fed to a sync separator which extracts the vertical and horizontal sync pulses. The analog to digital converter 68 converts the corresponding outputs into digital signals so that the digital signal processor 70 can determine the vertical and horizontal sync pulses in order to determine channel status and other operational and test conditions of the tuners 50, 52, and 54.

The digital signal processor 70 may perform such processing functions as time sampling, signal conditioning, signal processing, addition of forward error correction, signal formatting, and synchronization control of the tuners 50, 52, and 54, of the multiplexer 66, and of the analog to digital converter 68. The digital signal processor 70 is also responsible for conditioning its output so that it may be properly used to modulate a carrier. Finally, the digital signal processor 70 may add a channel stamp and/or a program identification stamp. Accordingly, the tunable receiver monitoring system 10 may have attributes of both active encoding and passive program and/or channel monitoring.

The digital signal processor 70 supplies its output to a digital to analog converter 72. The digital to analog converter 72 converts the digital quantity supplied to it by the digital signal processor 70 into an analog waveform. This analog waveform is passed through a bandpass filter 74 for isolation and safety reasons. The output of the bandpass filter 74 is supplied to a modulator 44. The modulator 44 also receives a carrier from a carrier source 78. For example, the carrier source 78 may be an FM station which supplies its output, in the form of an FM sub-carrier, to a lowpass filter 80 tuned to the sub-carrier used by the carrier source 78. The modulation signal supplied by the bandpass filter 74 is summed by the modulator 44 with the carrier from the lowpass filter 80, and the resulting modulated signal is supplied to the radio frequency transmitter 46 which causes the modulator carrier to be transmitted over the air by the transmitting antenna 48.

Accordingly, the reference side processing system 38 captures analog snippets, in turn, of each channel to be monitored. Each analog snippet is converted to digital format, conditioned, and provided with a channel stamp of the channel corresponding to the digitized snippet and/or with a program identifier. The digitized snippet, with its channel stamp and/or program identifier, is then converted back to an analog waveform which is used as a modulation signal to modulate a carrier. The modulated carrier is then transmitted. The transmitted modulated carrier consequently includes a plurality of sequential representations of the signals carried over the channels to be metered. While these reference side representations are shown herein as analog snippets, it should be understood that such representations might be instead quantized and transmitted in digital form, or they might be processed and transmitted as sets of analog or digital coefficients individually defining the electrical signals carried by the metered channels.

Figure 3:
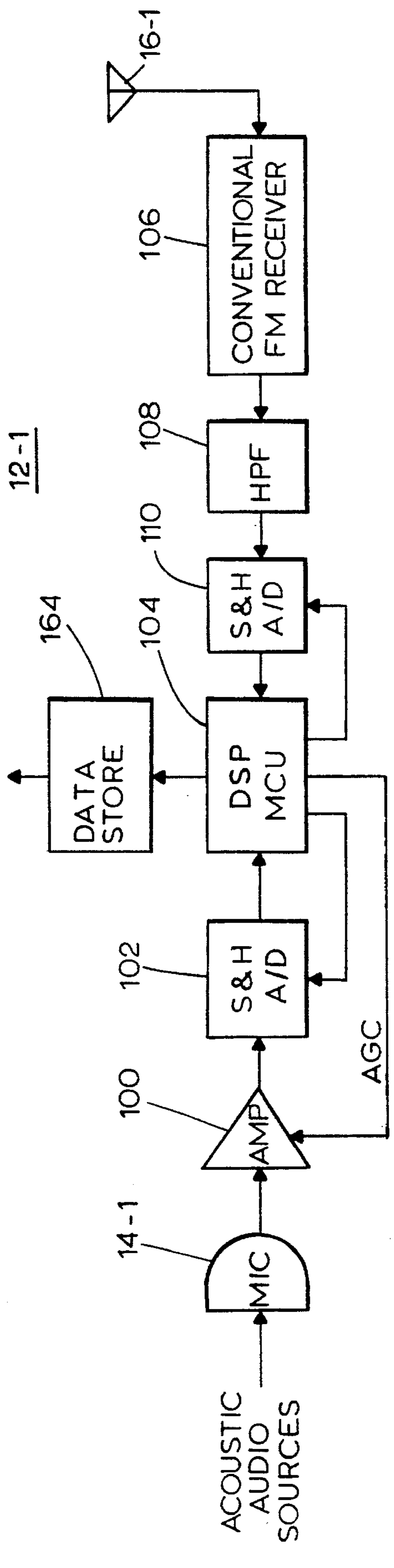
FIG. 3 illustrates the sample side of the tunable receiver monitoring system of FIG. 1 in additional detail.

One of the portable real time correlation monitoring devices 12-1 through 12-N, such as the portable real time correlation monitoring device 12-1, is shown in more detail in FIG. 3. As shown in FIG. 3, the portable real time correlation monitoring device 12-1 includes an audio amplifier 100 which amplifies the output of the microphone 14-1 and supplies this amplified output to an analog to digital converter 102. Accordingly, sound waves generated in the local area of the portable real time correlation monitoring device 12-1 are received and transduced into electrical signals by the microphone 14-1. These electrical signals are amplified to a level near to that of the reference side representations by use of the audio amplifier 100.

The audio amplifier 100 may have an automatic gain control function. This automatic gain control function may provide an extended dynamic input range, and may be used to reduce or mask local non-receiver produced sound signals (considered here as noise) such as conversation between members of the audience and other extraneous sounds. Such an amplifier control is common to speech processing used in cellular radio technology.

The amplified output signal from the audio amplifier 100 is converted to digital format by an analog to digital converter 102, and the amplified output signal in digital format is fed to a digital signal processor 104. The digitized and amplified signal supplied by the analog to digital converter 102 to the digital signal processor 104 may be referred to as a sample side representation which is derived from the audio output of a receiver being metered. The sample side representation represents the pattern of the acoustic sound waves that are received by the microphone 14-1, and may alternatively be referred to as a sample signature.

The modulated carrier signal transmitted by the transmitting antenna 48 from the reference side processing system 38 is received by the receiving antenna 16-1. An FM receiver 106 (which may be a conventional FM receiver, for example) is connected to the receiving antenna 16-1, and demodulates the modulated carrier in order to produce the baseband signals added to the carrier by the modulator 44 of the reference side processing system 38. The FM receiver 106 may be a fixed tuner type, or the FM receiver 106 may be an automatic scanning tuner type which is capable of automatically finding, and locking onto, the appropriate carrier transmitted by the reference side processing system 38.

Accordingly, the FM receiver 106 is tuned to select the carrier transmitted by the reference side processing system 38. A highpass filter 108 strips out the audio signals contained in the signals received by the receiving antenna 16-1 to which the FM receiver 106 is tuned so that the FM receiver 106 and the highpass filter 108 pass only the analog form of the reference side representations of the channels to be metered.

An analog to digital converter 110 is connected between the highpass filter 108 and the digital signal processor 104. The analog to digital converter 110 converts the analog output of the highpass filter 108 into a digital signal for processing by the digital signal processor 104. The digital signal processor 104 processes this digitized signal to account for, and/or correct, anomalies in the transmission channel. These anomalies may be caused, for example, by noise, fading, multipath and co-channel interference, and the like.

The digitized, time multiplexed reference side representations may be delayed by a memory of the digital signal processor 104 because the modulated carrier, which contains the analog, time multiplexed reference side representations received by the receiving antenna 16-1, propagate at a faster rate (near the speed of light) than do the acoustic sound waves (speed of sound) that are received by the microphone 14-1. The digital signal processor 104 correlates the digitized sample side representations received from the analog to digital converter 102 to the digitized reference side representations supplied by the analog to digital converter 110. Thus, because of the delay imposed upon the reference side representations by the digital signal processor 104, this correlation function takes into account the difference in propagation speeds between the acoustic signals received by the microphone 14-1 and the electromagnetic signals received by the receiving antenna 16-1.

Figure 4:
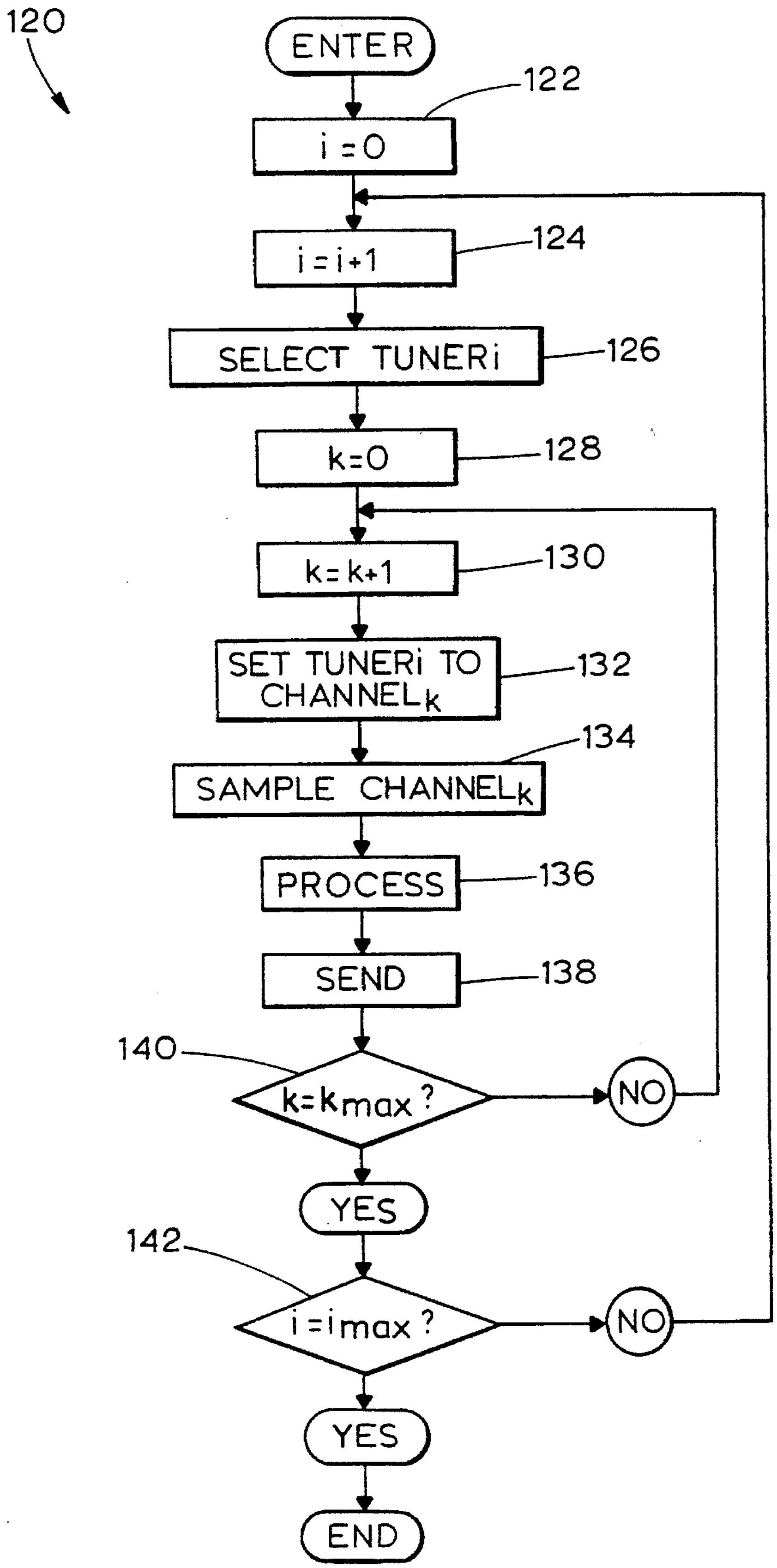
FIG. 4 illustrates a flow chart representing a computer program which may be executed by the digital signal processor (DSP) of FIG. 2.

The digital signal processor 70 may perform a computer program, such as the computer program 120, in order to control modulation of the carrier supplied by the carrier source 78. The computer program 120 is illustrated in FIG. 4, and includes a block of code 122 which, when the computer program 120 is entered, initially sets a variable i equal to zero. A block 124 then increments i by one, and a block 126 selects $tuner_i$ where i is initially equal to one. Thereafter, a block 128 sets a variable k to zero, and a block 130 increments the variable k by one. A block 132 then sets the $tuner_i$ to a $channel_k$ so that $tuner_i$ passes the electrical signal carried by $channel_k$. For example, if the tuner 50 shown in FIG. 2 is the first tuner, i.e. $tuner_i$ where i is equal to one, the tuner 50 is controlled by the digital signal processor 70 to tune to a first channel, i.e. $channel_k$ where k is equal to one.

A block 134 causes the $channel_k$ to be sampled. Thus, the digital signal processor 70 controls the multiplexer 66 and the analog to digital converter 68 to convert the analog output of the $tuner_i$ corresponding to $channel_k$ into a digital format. A block 136 processes the digitized signal of $channel_k$ by, for example, conditioning the signal, adding forward error correction, formatting, and adding a channel stamp corresponding to $channel_k$. A block 138 sends the resulting digitized signal as a modulation signal to the remaining portion of the reference side processing system 38 where the digitized signal is converted to an analog signal by the digital to analog converter 72, where the resulting analog signal is filtered by the bandpass filter 74, where the filtered analog signal is supplied to the modulator 44, where the carrier signal supplied by the lowpass filter 80 is modulated in the modulator 44 by the filtered analog signal, and where the modulated carrier is transmitted by the radio frequency transmitter 46 and the transmitting antenna 48.

A block 140 then determines whether the variable k is equal to $k_{max}$ for the $tuner_i$. If k is not equal to $k_{max}$, the computer program 120 returns to the block 130 where k is incremented by one. Then, the block 132 then sets $tuner_i$ to the next channel to be processed. Accordingly, snippets of the signals carried over each channel to which $tuner_i$ may be tuned are time multiplexed and are used to modulate a carrier for transmission by the transmitting antenna 48.

When $tuner_i$ is tuned to each of its channels which are to be monitored, i.e. the variable k is equal to $k_{max}$, a block 142 determines whether i is equal to $i_{max}$. If i is not equal to $i_{max}$, the computer program 120 returns to the block 124 where i is incremented by one. The block 126 selects the next tuner, the block 128 resets the variable k to zero, and the channels of the next tuner are processed by the blocks 130–140. When i is equal to $i_{max}$, the computer program 120 ends, and is either immediately reentered or reentered after a desired time delay.

Figure 5:
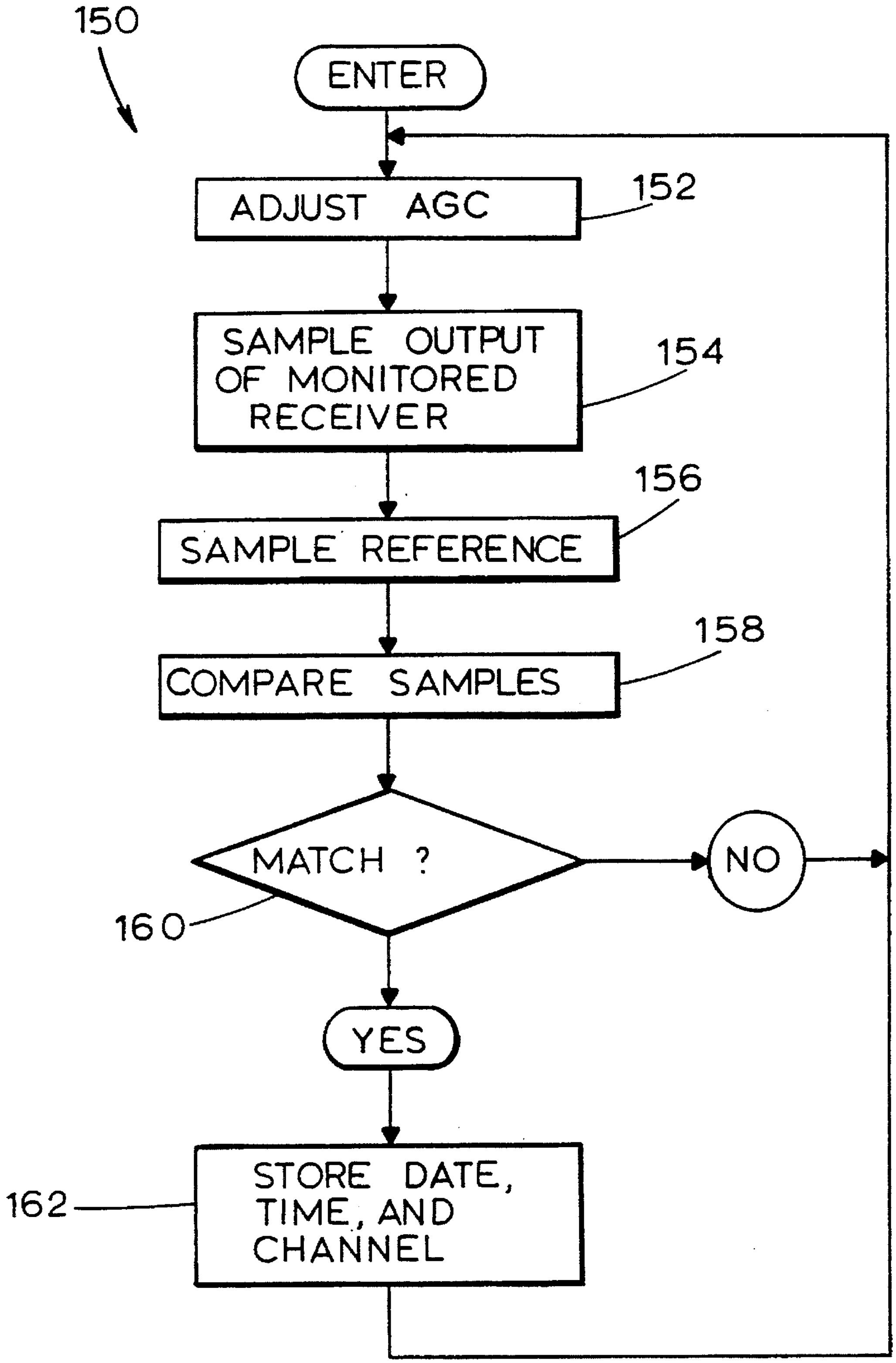
FIG. 5 illustrates a flow chart representing a computer program which may be executed by the digital signal processor (DSP) of FIG. 3.

In order to determine the channel to which the source of the audio signal received by the microphone 14-1 is tuned, the digital signal processor 104 of the portable real time correlation monitoring device 12-1 may execute a computer program such as a computer program 150 shown in FIG. 5.

When the computer program 150 is entered, a block 152 controls the automatic gain function of the audio amplifier 100 in order to amplify the electrical signal supplied by the microphone 14-1 to a level near that of the output of the FM receiver 106 and the highpass filter 108. A block 154 controls the analog to digital converter 102 in order to sample the output of the audio amplifier 100. This sampled output forms the sample side representation of the acoustic audio signal received by the microphone 14-1.

Similarly, a block 156 controls the analog to digital converter 110 to sample the output of the highpass filter 108 and to convert this output to a digital format. This sampled output forms the reference side representations received from the reference side processing system 38 by way of the antenna 16-1. A correlator block 158 correlates the sample side representation received from the analog to digital converter 102 to the reference side representations received from the analog to digital converter 110.

The correlator block 158 may implement any suitable correlation process. For example, the correlator block 158 may implement zero crossing detection involving the matching of the zero crossing points of the signals to be correlated. A digital comparison may also be implemented by the correlator block 158 in order to compare digital representations of the signals to be correlated. As another example, the correlator block 158 may use Linear Predictive Coding (LPC), which is a correlation method commonly used in speech analysis, or the correlator block 158 may use Short Time Spectral Analysis (STSA), which uses multi-rate signal processing techniques to do specialized spectral analysis and which may be modified in known ways to form a sliding correlator. Multi-rate signal processing techniques are currently used in digital filter banks, spectrum analysis, and many other digital signal processing algorithms. If desired, the correlator block 158 may implement a plurality of such techniques in order to increase confidence in detected matches between the sample side representation and the reference side representations.

As discussed above, the propagation time of the radio frequency transmissions between the transmitting antenna 48 and the receiving antenna 16-1, and the propagation time of the acoustic sound transmission between the monitored tunable receiver and the microphone 14-1, may likely not be the same. For example, if the reference side processing system 38 is located 10 kilometers from the portable real time correlation monitoring device 12-1, and the monitored tunable receiver is located 4 meters from the portable real time correlation monitoring device 12-1, the radio frequency transmissions take approximately 33.3 microseconds to propagate between the transmitting antenna 48 and the receiving antenna 16-1, whereas the acoustic sound transmissions take approximately 12.0 milliseconds to propagate between the monitored tunable receiver and the microphone 14-1 of the portable real time correlation monitoring device 12-1.

If the difference between the propagation times of the radio frequency transmissions and of the acoustic sound transmission is fixed, a simple time delay may be used to delay the reference side representations sufficiently that the reference side representations are synchronized to the sample side representations, i.e. that the reference side representations and the sample side representations, which are derived from the same section of audio, arrive at the correlator at the same time. Such may be the case when the real time correlation meter of the present invention is embodied as a fixed location real time correlation meter.

However, it is unlikely that the difference between the radio frequency transmission propagation time and the acoustic sound transmission propagation time is fixed, particularly where the real time correlation meter of the present invention is embodied as a portable real time correlation meter. That is, although the propagation time of the radio frequency transmissions between the transmitting antenna 48 and the receiving antenna 16-1 does not appreciably change as the portable real time correlation monitoring device 12-1 is carried about by its corresponding panelist, the propagation time of the acoustic sound transmission between the monitored receiver and the microphone 14-1 can change significantly. For example, the propagation time of the acoustic sound transmission between the monitored receiver and the microphone 14-1 can vary from about 2.9 milliseconds when there are three feet between the monitored receiver and the microphone 14-1 to about 23.3 milliseconds when there are 24 feet between the monitored receiver and the microphone 14-1, assuming standard pressure conditions at 20° C.

Accordingly, if desired, adaptive time delay techniques may be employed in order to synchronize the reference side representations to the sample side representations. Alternatively, a sliding correlation function may be employed to account for the variations in the difference between the radio frequency transmission propagation time and the acoustic sound transmission propagation time. That is, the reference side representations and the sample side representations may be adjusted with respect to one another along a time axis in order to find the point of maximum correlation between them. The resulting maximum correlation can then be compared to a threshold in order to determine if this correlation is sufficiently large to infer a match between the reference side representations and the sample side representations. Such sliding correlation functions are used in a wide variety of known systems, such as in spread spectrum systems. (Echo cancellation techniques may also be necessary on both sides of the digital signal processor 104 to correct for multipath, reverberation, and other phenomena.)

If a block 160 does not detect a match between the sample side representation and the reference side representations, the computer program 150 returns to the block 152 for continued processing. If the block 160 detects a match, a block 162 causes a match record to be stored in a memory 164 (see FIG. 3) of the portable real time correlation monitoring device 12-1. This match record indicates the tuning status of a tunable receiver. This tuning status may comprise (i) the date of the match, or (ii) the time of the match, or (iii) the channel contained in the reference side representation that matched with the sample side representation, or (iv) the program identification contained in the reference side representation that matched with the sample side representation, or (v) any combination of the above or the like. Thus, if a program identification stamp is also included in the reference side representation, the program identification stamp may also be stored in the memory 164 as part of the match record. After this match record is stored in the memory 164, the computer program 150 returns to the block 152 for continued processing. Furthermore, it is possible to compare match records in order to edit miscoding of program identification stamps in the reference side representations, to compress data by eliminating duplicate data from corresponding match records, and the like.

Periodically, the match records stored in the memory 164 may be downloaded to a remote point, such as by way of the public telephone system.

Figure 6:
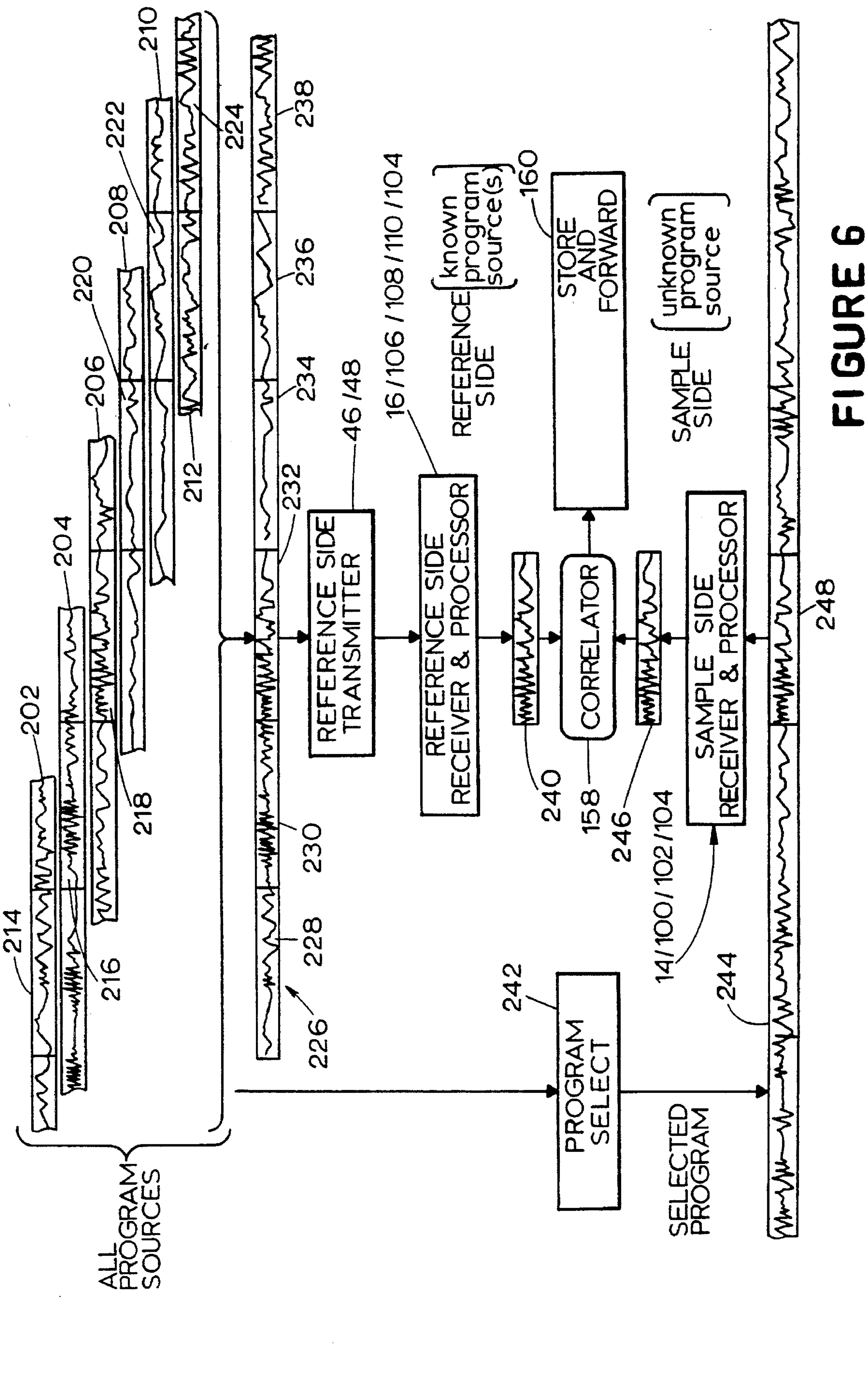
FIG. 6 illustrates the correlation function performed by the digital signal processor (DSP) illustrated in FIG. 3.

FIG. 6 graphically illustrates the correlation function implemented by the correlator block 158 of FIG. 5. FIG. 6 uses some of the same reference numerals of FIG. 2 in order to indicate corresponding elements. As shown in FIG. 6, six program sources are represented by the six audio portions 202, 204, 206, 208, 210, and 212 resulting from demodulations of corresponding program source radio frequency transmissions. The multiplexer 66, under control of the digital signal processor 70, takes snippets 214, 216, 218, 220, 222, and 224 from the corresponding audio portions 202, 204, 206, 208, 210, and 212 of the program source radio frequency transmissions. The output of the multiplexer 66 is converted to digital format by the analog to digital converter 68, processed by the digital signal processor 70, converted back to analog format by the digital to analog converter 72, filtered by the bandpass filter 74, and used to modulate the carrier supplied by the carrier source 78 and the lowpass filter 80.

As a consequence, a time division multiplex signal 226 is transmitted by the reference side transmitter, comprising the radio frequency transmitter 46 and the transmitting antenna 48, to the reference side receiver and processor, comprising the receiving antenna 16-1, the FM receiver 106, the highpass filter 108, the analog to digital converter 110, and the digital signal processor 104.

The time division multiplexed signal 226 includes a plurality of reference side representations 228, 230, 232, 234, 236, and 238 where the reference side representation 228 corresponds to the snippet 214, the reference side representation 230 corresponds to the snippet 216, the reference side representation 232 corresponds to the snippet 218, the reference side representation 234 corresponds to the snippet 220, the reference side representation 236 corresponds to the snippet 222, and the reference side representation 238 corresponds to the snippet 224. Accordingly, for any appropriate slice of time, a reference side representation 240 is presented to the correlator block 158.

In the snap shot of time shown in FIG. 6, the reference side representation 240 corresponds to the reference side representation 232 which, in turn, corresponds to the snippet 218 of the audio portion 206 of one of the program source radio frequency transmissions. One time slice earlier, the reference side representation 240 corresponded to the reference side representation 234 which, in turn, corresponds to the snippet 220 of the audio portion 208 of one of the program source radio frequency transmission, whereas one time slice later, the reference side representation 240 will correspond to the reference side representation 230 which, in turn, corresponds to the snippet 216 of the audio portion 204 of one of the program source radio frequency transmissions.

By the same token, a program selector 242, which also receives the program source radio frequency transmissions from which the audio portions 202, 204, 206, 208, 210, and 212 may be derived, and which may correspond to one of the program selectors 22 or 30, selects a channel corresponding to one of the program source radio frequency transmissions, and provides an output signal 244 which may be in the form of an acoustic audio output. This output signal 244 is sampled by the sample side receiver and processor, comprising the microphone 14-1, the audio amplifier 100, the analog to digital converter 102, and the digital signal processor 104, so that a sample side representation 246, which corresponds to a snippet 248 of the output signal 244, is presented to the correlator block 158. The correlator block 158 produces a correlation between the reference side representation 240 and the sample side representation 246, and this correlation is tested by the block 160 to determine whether the reference side representation 240 and the sample side representation 246 match.

As mentioned previously, because of variations in the difference between the radio frequency transmission propagation time and the acoustic sound transmission propagation time, proper matching of the reference side representation 240 to the sample side representation 246 may require that these two representations be synchronized. Synchronization may be achieved, for example, by applying a sliding correlation function to the reference side representation 240 and the sample side representation 246. That is, the correlator block 158 may adjust the reference side representation 240 and the sample side representation 246 with respect to one another along a time axis to find the point of maximum correlation between them. The resulting maximum correlation can then be compared by the block 160 to a threshold in order to determine if this correlation is sufficiently large to infer a match between the reference side representation 240 and the sample side representation 246. The correlator block 158 may implement adaptive processing since, as long as the real time correlation device is in a non-moving state, the point of optimum correlation can be quickly learned and used to shorten the time of achieving maximum correlation. When the real time correlation device is again in a moving state, the time line may again be extended.

Figure 7:
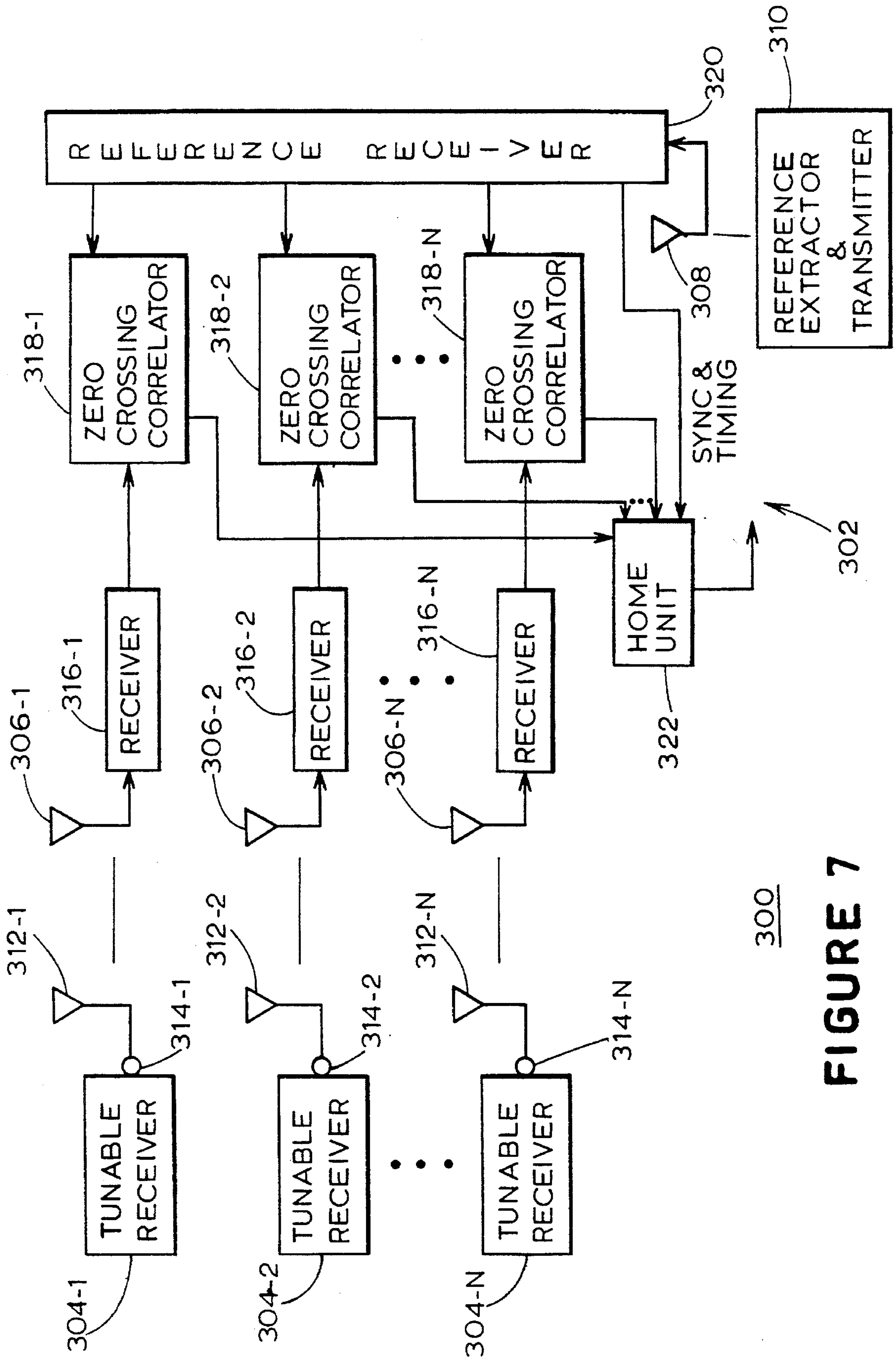
FIG. 7 illustrates a tunable receiver monitoring system which includes a plurality of fixed location real time correlation meters for determining the channels to which a plurality of tunable receivers are tuned; and, FIG. 8 illustrates an alternative tunable receiver monitoring system according to the present invention.

The real time correlation meter of the present invention embodied as a fixed location real time correlation meter is illustrated in FIG. 7. As shown in FIG. 7, a tunable receiver monitoring system 300 includes a fixed location real time correlation monitoring device 302. The real time correlation monitoring device 302 is fixed at a convenient location within a structure containing one or more tunable receivers to be monitored, such as tunable receivers 304-1 through 304-N. The fixed location real time correlation monitoring device 302 may be powered by electrical power from a wall outlet, a battery such as a rechargeable battery, and/or the like.

The fixed location real time correlation monitoring device 302 has one or more signal collectors 306, such as broadcast signal collectors 306-1 through 306-N. The signal collectors 306-1 through 306-N may be in the form of antennas, for example, which receive electromagnetic signals transmitted from the locations of the tunable receivers 304-1 through 304-N. The fixed location real time correlation monitoring device 302 also has a receiving antenna 308 for receiving reference side representations from a reference side processing system 310 similar to the reference side processing system 38 shown in FIGS. 1–6.

The tunable receivers 304-1 through 304-N have corresponding antennae 312-1 through 312-N. These antennae 312-1 through 312-N may have corresponding tunable receiver output pick-ups 314-1 through 314-N to pick up corresponding outputs of the tunable receivers 304-1 through 304-N. These outputs of the tunable receivers 304-1 through 304-N, as picked up by the corresponding tunable receiver output pick-ups 314-1 through 314-N, are mixed with corresponding carriers and are transmitted by the corresponding antennae 312-1 through 312-N. Accordingly, the fixed location real time correlation monitoring device 302 may remotely monitor the tunable receivers 304-1 through 304-N wherever the tunable receivers 304-1 through 304-N are located throughout a home.

These tunable receiver output pick-ups 314-1 through 314-N, for example, may be microphones to acoustically detect the audio outputs of the tunable receivers 304-1 through 304-N. If so, the tunable receiver output pick-ups 314-1 through 314-N transduce the audio outputs of their corresponding tunable receivers 304-1 through 304-N into corresponding electrical signals for mixing with corresponding carriers and for transmission by the corresponding antennae 312-1 through 312-N. Alternatively, the tunable receiver output pick-ups 314-1 through 314-N may be photocell pick-ups for detecting the luminosities of televisions to be monitored. If so, the tunable receiver output pick-ups 314-1 through 314-N transduce the video outputs of their corresponding tunable receivers 304-1 through 304-N into corresponding electrical signals for mixing with corresponding carriers and for transmission by the corresponding antennae 312-1 through 312-N. In a further alternative, the tunable receiver output pick-ups 314-1 through 314-N may be induction coils for detecting the appropriated electromagnetic fields generated by the receivers to be monitored.

The fixed location real time correlation monitoring device 302 includes a plurality of receivers 316-1 through 316-N each of which is connected to a corresponding signal collector 306-1 through 306-N and each of which is tuned to the carrier transmitted by a corresponding antenna 312-1 through 312-N. Each of the receivers 316-1 through 316-N strips out its corresponding carrier and passes its corresponding baseband signal to a corresponding zero-crossing correlator 318-1 through 318-N. These baseband signals represent the sample side representations of the programs to which their corresponding tunable receivers 304-1 through 304-N are tuned.

The fixed location real time correlation monitoring device 302 also includes a reference receiver 320 which is connected to the receiving antenna 308. The reference receiver 320 demodulates the modulated carrier transmitted by the reference side processing system 310 in order to pass the reference side representations in parallel to the zero-crossing correlators 318-1 through 318-N.

The zero-crossing correlators 318-1 through 318-N correlate the sample side representations from their corresponding receivers 316-1 through 316-N to the reference side representations supplied by the reference receiver 320. The zero-crossing correlators 318-1 through 318-N may, for example, execute a computer program similar to the computer program 150 shown in FIG. 5. If a match is detected by a zero-crossing correlator 318-1 through 318-N, a match record is transmitted to a home unit 322 of the fixed location real time correlation monitoring device 302 where the match record is stored in a memory. As described above, a match record indicates the tuning status of a tunable receiver. This tuning status may comprise (i) the date of the match, or (ii) the time of the match, or (iii) the channel contained in the reference side representation that matched with the sample side representation, or (iv) the program identification contained in the reference side representation that matched with the sample side representation, or (v) any combination of the above or the like. Periodically, the match records stored in the memory of the home unit 322 may be downloaded by the home unit 322 to a remote point, such as by way of the public telephone system.

Figure 8:
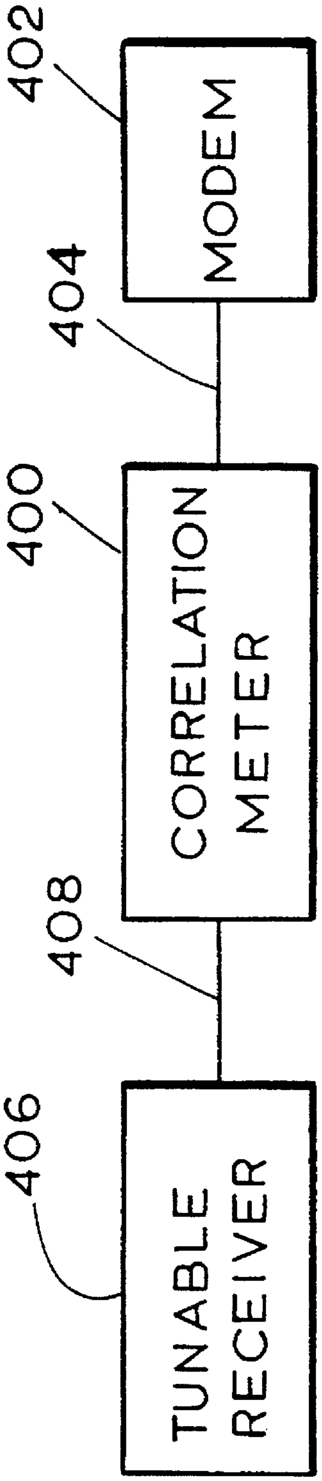

Certain modifications have been discussed above. For example, as described above, the receiving antennae 16-1 through 16-N and 308 of the corresponding portable and fixed location real time correlation monitoring devices 12-1 through 12-N and 302 receive reference side representations by use of an FM radio frequency sub-carrier. It was also described above that transmission media, other than an FM radio frequency sub-carrier, may be used to transmit the reference side representations to the portable and fixed location real time correlation monitoring devices 12-1 through 12-N and 302. Thus, as shown in FIG. 8, a correlation meter 400 may be connected to a modem 402, for example, by an electrical connector 404 so that the correlation meter 400 can receive reference side representations over carrier lines such as telephone lines. Also, microwaves, cables, satellites, and/or the like may instead be used to transmit the reference side representations to a correlation meter.

Other modifications will occur to those skilled in the art. For example, although each of the portable real time correlation monitoring devices 12-1 through 12-N has been shown with a corresponding microphone 14-1 through 14-N to receive an audio signal from a tunable receiver, and although each of the tunable receiver output pick-ups 314-1 through 314-N has been described as either a microphone or a photocell, it should be appreciated that one or more of the microphones 14-1 through 14-N, or one or more of the tunable receiver output pick-ups 314-1 through 314-N, could be replaced with electrical jacks to be plugged into corresponding audio and/or video jacks on the monitored tunable receivers. Thus, as shown in FIG. 8, the correlation meter 400 may be connected to either an audio jack or a video jack of a tunable receiver 406 by an electrical connector 408. Accordingly, the correlation meter of the present invention can receive the audio and/or video output of the receivers to be monitored by a direct electrical connection.

Furthermore, it should also be appreciated that, if televisions are to be monitored, either the audio or the video of the television may be used by the portable real time correlation monitoring devices 12-1 through 12-N. If video is to be used, then the portable real time correlation monitoring devices 12-1 through 12-N may be arranged to receive the video of the receivers to be monitored. In this case, the microphones 14-1 through 14-N may be replaced by photocell pickups for spatially averaging the time-varying luminosities of televisions to be monitored. The patterns of these spatially averaged time-varying luminosities of the televisions to be monitored are correlated to similarly derived reference patterns in order to determine the programs to which the monitored televisions are tuned. On the other hand, as discussed above, the microphones 14-1 through 14-N may be replaced by electrical jacks to be plugged into corresponding video jacks on the television to be monitored. Accordingly, instead of receiving the light outputs of the picture tubes of the televisions to be monitored, the portable real time correlation monitoring devices 12-1 through 12-N could receive the video of the televisions to be monitored by a direct electrical connection.

Moreover, although a portable real time correlation meter and a fixed location real time correlation meter have been shown herein as separate devices, it should be apparent that a single real time correlation meter may double as both a portable real time correlation meter and a fixed location real time correlation meter. For example, a real time correlation meter according to the present invention may have a base unit that it plugs into when the real time correlation meter is to be used as a fixed location real time correlation meter. Such a base unit may perform the functions of charging the battery of the real time correlation meter and of communicating with a home unit or other equipment. However, when the real time correlation unit is to be used as a portable real time correlation meter, it is simply unplugged from its base unit and carried by the panelist.

On the other hand, a real time correlation meter which doubles as both a portable real time correlation meter and a fixed location real time correlation meter need not have a base unit. Instead, this real time correlation meter may plug directly into a wall outlet in order to charge its own battery and may have internal communications capability so that it can communicate directly with a home unit or other equipment.

All such modifications are intended to be within the scope of the present invention.

We claim:

1. A correlation meter comprising:

first receiving means for receiving an output of a tunable receiver and for providing a sample side representation, wherein the sample side representation represents a pattern of the output of the tunable receiver;

second receiving means for receiving a plurality of reference side representations from a single remote source of reference side representations, wherein the reference side representations represent a plurality of patterns corresponding to signals carried by a plurality of channels to which the tunable receiver may be tuned; and, correlating means for correlating the sample side representation and the reference side representations substantially as the reference side representations are received by the second receiving means and for thereby determining a tuning status of the tunable receiver.

2. The correlation meter of claim 1 wherein the reference side representations are sequentially correlated to the sample side representation substantially as the reference side representations are received by the second receiving means.

3. The correlation meter of claim 2 wherein the reference side representations are time division multiplexed.

4. The correlation meter of claim 3 wherein the second receiving means comprises an antenna for receiving a transmission from which the reference side representations can be extracted.

5. The correlation meter of claim 2 wherein the reference side representations are digital reference side representations, wherein the sample side representation is a digital sample side representation, and wherein the correlating means comprises processing means for correlating the digital sample side representation and the digital reference side representations in order to determine the tuning status of the tunable receiver.

6. The correlation meter of claim 2 wherein the correlation meter is a portable correlation meter.

7. The correlation meter of claim 2 wherein the correlation meter is a fixed location correlation meter.

8. The correlation meter of claim 2 wherein the output of the tunable receiver is a video output, and wherein the first receiving means comprises means or receiving the video output of the tunable receiver.

9. The correlation meter of claim 8 wherein the means for receiving the video output comprises a light receiving means for receiving light emitted by the tunable receiver.

10. The correlation meter of claim 8 wherein the means for receiving the video output comprises an electrical connector for connecting a video output jack of the tunable receiver to the correlation meter.

11. The correlation meter of claim 2 wherein the output of the tunable receiver is an audio output, and wherein the first receiving means comprises means for receiving the audio output of the tunable receiver.

12. The correlation meter of claim 11 wherein the audio output is an acoustic output, and wherein the first receiving means comprises transducing means for transducing the acoustic output of the tunable receiver into an electrical signal.

13. The correlation meter of claim 11 wherein the means for receiving the audio output comprises an electrical connector for connecting an audio output jack of the tunable receiver to the correlation meter.

14. The correlation meter of claim 11 wherein the second receiving means comprises an antenna for receiving a transmission from which the reference side representations can be extracted.

15. A real time tunable receiver monitoring system comprising:

first means for receiving a plurality of transmission signals carried by a plurality of corresponding channels, wherein the channels correspond to channels to which a tunable receiver may be tuned;

second means coupled to the first means for generating a plurality of reference side representations based upon the transmission signals received by the first means, wherein each reference side representation represents a pattern of a corresponding transmission signal and includes an identifier identifying a corresponding source or channel;

third means coupled to the second means for transmitting the reference side representations;

fourth means for receiving the reference side representations;

fifth means for receiving an output of a tunable receiver and for providing a sample side representation of the output, wherein the sample side representation represents a pattern of the output; and, correlating means coupled to the fourth and fifth means for correlating the sample side representation and the reference side representations and for thereby determining a tuning status of the tunable receiver, wherein the reference side representations are correlated by the correlating means to the sample side representation substantially in real time.

16. The real time tunable receiver monitoring system of claim 15 wherein the reference side representations are sequentially correlated to the sample side representation substantially as the reference side representations are received by the second receiving means.

17. The real time tunable receiver monitoring system of claim 16 wherein the reference side representations are time division multiplexed.

18. The real time tunable receiver monitoring system of claim 17 wherein the fourth means comprises an antenna for receiving a transmission from which the reference side representations can be extracted.

19. The real time tunable receiver monitoring system of claim 16 wherein the reference side representations are digital reference side representations, wherein the sample side representation is a digital sample side representation, and wherein the correlating means comprises processing means for correlating the digital sample side representation and the digital reference side representations in order to determine the tuning status of the tunable receiver.

20. The real time tunable receiver monitoring system of claim 16 wherein the fourth and fifth means and the correlating means comprises a portable correlation meter.

21. The real time tunable receiver monitoring system of claim 16 wherein the fourth and fifth means and the correlating means comprises a fixed location correlation meter.

22. The real time tunable receiver monitoring system of claim 16 wherein the output of the tunable receiver is a video output, and wherein the fifth means comprises means for receiving the video output of the tunable receiver.

23. The real time tunable receiver monitoring system of claim 22 wherein the means for receiving the video output comprises a light receiving means for receiving light emitted by the tunable receiver.

24. The real time tunable receiver monitoring system of claim 22 wherein the means for receiving the video output comprises an electrical connector for connecting a video output jack of the tunable receiver to the correlation meter.

25. The real time tunable receiver monitoring system of claim 16 wherein the output of the tunable receiver is an audio output, and wherein the fifth means comprises means for receiving the audio output of the tunable receiver.

26. The real time tunable receiver monitoring system of claim 25 wherein the audio output is an acoustic output, and wherein the fifth means comprises transducing means for transducing the acoustic output of the tunable receiver into an electrical signal.

27. The real time tunable receiver monitoring system of claim 25 wherein the means for receiving the audio output comprises an electrical connector for connecting an audio output jack of the tunable receiver to the correlation meter.

28. The real time tunable receiver monitoring system of claim 25 wherein the fourth means comprises an antenna for receiving a transmission from which the reference side representations can be extracted.

29. The real time tunable receiver monitoring system of claim 16 wherein the first means comprises tuning means for tuning to at least some of the channels to which the tunable receiver may be tuned.

30. The real time tunable receiver monitoring system of claim 29 wherein the third means comprises modulating means for modulating a carrier based upon the reference side representations.

31. The real time tunable receiver monitoring system of claim 29 wherein the second means comprises digitizing means for digitizing the transmission signals received by the first means.

32. The real time tunable receiver monitoring system of claim 31 wherein the second means comprises a processor which is arranged to process the digitized transmission signals.

33. The real time tunable receiver monitoring system of claim 31 wherein the second means comprises converting means for converting the digitized and processed transmission signals into modulation signals.

34. The real time tunable receiver monitoring system of claim 33 wherein the third means comprises mixing means for mixing the modulation signals with a carrier in order to modulate the carrier.

35. The real time tunable receiver monitoring system of claim 34 wherein the fourth means comprises demodulating means for receiving the modulated carrier and for demodulating the received modulated carrier in order to produce the reference side representations from the modulated carrier.

36. The real time tunable receiver monitoring system of claim 35 wherein the fourth means comprises means for converting the demodulated modulated carrier to digital reference side representations.

37. The real time tunable receiver monitoring system of claim 36 wherein the fifth means comprises means for converting the output of a tunable receiver to a digital sample side representation.

38. The real time tunable receiver monitoring system of claim 37 wherein the correlating means comprises a processor which is arranged for correlating the digital sample side representation and the digital reference side representations in order to determine the tuning status of the tunable receiver.

39. The real time tunable receiver monitoring system of claim 38 wherein the reference side representations are time division multiplexed.

40. The real time tunable receiver monitoring system of claim 39 wherein the third means comprises an antenna which is arranged to transmit the modulated carrier over the air.

41. The real time tunable receiver monitoring system of claim 40 wherein the fourth means comprises an antenna which is arranged to receive the modulated carrier transmitted by the third means.

42. The real time tunable receiver monitoring system of claim 41 wherein the output of the monitored receiver is an acoustic output, and wherein the fifth means comprises transducing means for transducing the acoustic output of the tunable receiver into an electrical signal.

43. The real time tunable receiver monitoring system of claim 42 wherein the electrical signal is a sample side analog electrical signal, and wherein the fifth means comprises means for converting the sample side analog electrical signal to the digital sample side representation.

44. A portable correlation meter comprising:

a microphone, wherein the microphone is arranged to receive an acoustic audio output of a tunable receiver, wherein the microphone is arranged to transduce the acoustic audio output into an electrical signal, and wherein the microphone is arranged to provide the electrical signal as a sample side representation;

an antenna, wherein the antenna is arranged to receive a carrier which is modulated with a plurality of multiplexed reference side representations corresponding to a plurality of channels to which the tunable receiver may be tuned;

a receiver coupled to the antenna, wherein the receiver is arranged to demodulate the modulated carrier in order to extract the multiplexed reference side representations therefrom; and, a processor coupled to the microphone and to the receiver, wherein the processor is arranged to correlate the sample side representation and the multiplexed reference side representations substantially as the multiplexed reference side representations are received by the antenna in order to determine a tuning status of the tunable receiver.

45. The portable correlation meter of claim 44 wherein the microphone includes an analog to digital converter, wherein the analog to digital converter is arranged to convert the electrical signal to a digital sample side representation, and wherein the processor is arranged to correlate the digital sample side representation and the reference side representations.

46. The portable correlation meter of claim 45 wherein the processor includes an analog to digital converter, wherein the analog to digital converter of the processor is arranged to produce digital reference side representations, and wherein the processor is arranged to correlate the digital sample side representation and the digital reference side representations.

47. The portable correlation meter of claim 44 wherein the processor is arranged to sequentially correlate the reference side representations with the sample side representations substantially as the reference side representations are received.

48. A tunable receiver monitoring system comprising:

a reference signature generator including reference signature extracting means for extracting reference signatures from a plurality of corresponding channels, wherein the channels correspond to channels to which a tunable receiver may be tuned, and reference signature transmitting means for transmitting the reference signatures; and, a receiver monitor, the receiver monitor being located remotely from the reference signature processor and including reference signature receiving means for receiving the transmitted reference signatures from the reference signature transmitting means, sample signature extracting means for extracting a sample signature from an output of a tunable receiver to be monitored, the output corresponding to a channel to which the tunable receiver is tuned, and correlating means coupled to the reference signature receiving means and to the sample signature extracting means for correlating the sample signature and the reference signatures substantially in real time in order to determine a tuning status of the tunable receiver.

49. The tunable receiver monitoring system of claim 48 wherein the reference signature transmitting means transmits the reference signatures over the air.

50. The tunable receiver monitoring system of claim 48 wherein the reference signature transmitting means transmits the reference signatures over a cable.

51. The tunable receiver monitoring system of claim 48 wherein the correlating means is arranged to sequentially correlate the reference signature with the sample signature substantially in real time.

52. A correlation meter comprising:

first receiving means for receiving an output of a tunable receiver and for providing a sample side signature, wherein the sample side signature represents a pattern of the output of the tunable receiver;

second receiving means for receiving a transmission signal transmitted by a remote source, the transmission signal including a plurality of reference side signatures extracted and mixed from a corresponding plurality of channels, wherein the channels correspond to channels to which the tunable receiver may be tuned; and, correlating means for correlating the sample side signature and the reference side signatures of the transmission signal substantially as the transmission signal is received by the second receiving means and for thereby determining a tuning status of the tunable receiver.

53. The correlation meter of claim 52 wherein each reference side signature includes an identification code identifying a source of its corresponding reference side signature.

54. The correlation meter of claim 53 wherein the source is a program, and wherein each identification code identifies a corresponding program from which its corresponding reference signature was extracted.

55. The correlation meter of claim 53 wherein the source is a channel, and wherein each identification code identifies a corresponding channel from which its corresponding reference signature was extracted.

* * * * *